United States Patent
Daggubati et al.

(10) Patent No.: US 11,451,747 B2
(45) Date of Patent: Sep. 20, 2022

(54) SYSTEM ENABLING MULTIPLE SCREENS SHARING IN AN ONLINE MEETING

(71) Applicants: Kishore Daggubati, Danville, CA (US); Sai Prasad Matam, Pleasanton, CA (US)

(72) Inventors: Kishore Daggubati, Danville, CA (US); Sai Prasad Matam, Pleasanton, CA (US)

( * ) Notice: Subject to any disclaimer, the term of this patent is extended or adjusted under 35 U.S.C. 154(b) by 183 days.

(21) Appl. No.: 16/991,067

(22) Filed: Aug. 12, 2020

(65) Prior Publication Data

US 2021/0152778 A1 May 20, 2021

(51) Int. Cl.
*H04N 7/15* (2006.01)
*H04L 12/18* (2006.01)
*G06F 3/14* (2006.01)
*H04N 7/14* (2006.01)

(52) U.S. Cl.
CPC ........ *H04N 7/152* (2013.01); *G06F 3/1454* (2013.01); *H04L 12/1822* (2013.01); *H04L 12/1831* (2013.01); *H04N 7/147* (2013.01); *H04N 7/15* (2013.01); *H04N 7/155* (2013.01)

(58) Field of Classification Search
CPC .............. G06F 3/1454; H04L 12/1822; H04L 12/1831; H04N 7/147; H04N 7/15; H04N 7/152; H04N 7/155
See application file for complete search history.

(56) References Cited

U.S. PATENT DOCUMENTS

| | | | | |
|---|---|---|---|---|
| 9,544,343 | B2* | 1/2017 | Ouyang | H04L 65/403 |
| 9,571,534 | B2* | 2/2017 | Ding | G06F 3/1454 |
| 10,542,126 | B2* | 1/2020 | Nayak | H04L 12/1831 |
| 2006/0002315 | A1* | 1/2006 | Theurer | H04L 67/1095 |
| | | | | 370/261 |
| 2008/0267282 | A1* | 10/2008 | Kalipatnapu | H04M 3/562 |
| | | | | 348/E7.084 |
| 2014/0258406 | A1* | 9/2014 | Salesky | H04L 67/32 |
| | | | | 709/204 |
| 2016/0150184 | A1* | 5/2016 | Gandhi | H04N 7/147 |
| | | | | 348/14.08 |

OTHER PUBLICATIONS

Zoom. "Sharing Multiple Screens Simultaneously." Jun. 27, 2018, https://web.archive.org/web/20180627164705/https://support.zoom.us/hc/en-us/articles/115000424286-Sharing-Multiple-Screens-Simultaneously; accessed Apr. 8, 2022 (Year: 2018).*

* cited by examiner

*Primary Examiner* — Thomas J Dailey

(57) ABSTRACT

A system enabling multiple screens sharing in an online meeting. The system comprises a first data processing system 102 comprising a first processor module 202 and a first digital client 214. The first processor module 202 causes the first digital client 214 to individually share at least a first screen 110 and a second screen 112. The system further comprises a second data processing system 104 comprising a second processor module 302 and a second digital client 314, the second processor module 302 causing the second digital client 314 to individually share at least a third screen 114 and a fourth screen 116. The first digital client 214 shares the first screen 110 and the second screen 112 while the second digital client 314 shares the third screen 114 and the fourth screen 116.

18 Claims, 15 Drawing Sheets

SYSTEM ENABLING MULTIPLE SCREENS SHARING IN AN ONLINE MEETING

BACKGROUND

Field

The disclosed subject matter relates to the field of video conferencing. More particularly, but not exclusively, the subject matter relates to screen sharing in video conferencing.

Discussion of Related Field

The ubiquitous characteristic of the internet coupled with the massive technological growth in electronic communication devices has had a paradigm shift in the way people communicate and network with each other. More particularly, video conferencing has grown into daily routine to connect with people. Video conferencing finds its role in various walks of life such consulting a doctor, work meetings, connecting with friends so on and so forth. In most cases, the video conferencing is complemented with a screen sharing facility, wherein a participant is able to share the screen of the digital device with all other participants in a meeting.

However, the existing systems enable a participant to share only one screen at any point in time which is highly undesirable because many a times there is a requirement to look at multiple screens simultaneously. As an example, a participant in a meeting wants to compare results present in two documents and is able to share only one screen or tab or window containing that document. Therefore, the objective of comparing the documents is not realized thereby the purpose of the meeting.

Additionally, in certain scenario, there is a requirement of sharing multiple screens by each of the participants in a meeting simultaneously. This feature is highly desirable in a team meeting. However, the existing systems do not offer the ability to share multiple screens of each of the participants of the meeting simultaneously.

In light of the above, it is apparent that there is a need for an improved system for enabling multiple screen simultaneously in an online meeting.

SUMMARY

In one embodiment, a system enabling multiple screens sharing in an online meeting is disclosed. The system may comprise a first data processing system comprising a first processor module and a first digital client. The first processor module causes the first digital client to individually share at least a first screen and a second screen. The system further comprises a second data processing system comprising a second processor module and a second digital client. The second processor module causes the second digital client to individually share at least a third screen and a fourth screen. The first digital client may share the first screen and the second screen while the second digital client shares the third screen and the fourth screen. The first digital client may comprise a first digital client display interface configured to display visual content of the third screen and the fourth screen in individual display windows and the second digital client may comprise a second digital client display interface configured to display visual content of the first screen and the second screen in individual display windows, while the first digital client displays the visual content of the third screen and the fourth screen.

BRIEF DESCRIPTION OF DRAWINGS

Embodiments are illustrated by way of example and not limitation in the figures of the accompanying drawings, in which like references indicate similar elements and in which.

DETAILED DESCRIPTION

The following detailed description includes references to the accompanying drawings, which form a part of the detailed description. The drawings show illustrations in accordance with example embodiments. These example embodiments, which may be herein also referred to as "examples" are described in enough detail to enable those skilled in the art to practice the present subject matter. However, it may be apparent to one with ordinary skill in the art, that the present invention may be practised without these specific details. In other instances, well-known methods, procedures and components have not been described in detail so as not to unnecessarily obscure aspects of the embodiments. The embodiments can be combined, other embodiments can be utilized, or structural, logical, and design changes can be made without departing from the scope of the claims. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated.

Figure 1:
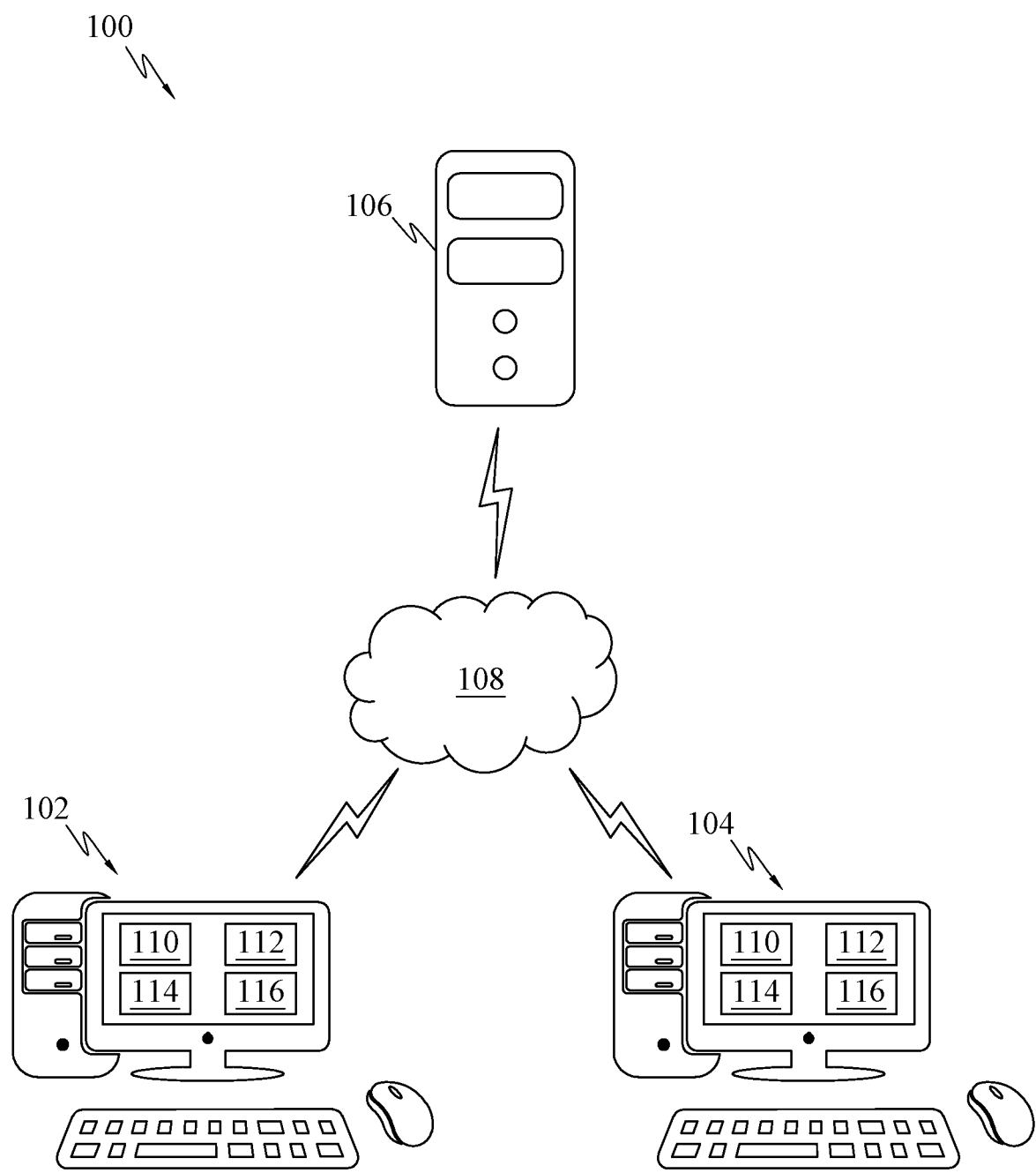
FIG. 1 illustrates a system for enabling multiple screens sharing in an online meeting, in accordance with an embodiment.

FIG. 1 illustrates a system 100 for enabling multiple screens sharing in an online meeting, in accordance with an embodiment. The system may comprise a first data processing system 102, a second data processing system 104, a communication network 108 and a remote server 106. The first data processing system 102 may individually share a first screen 110 and a second screen 112 and similarly the second data processing system 104 may share a third screen 114 and a fourth screen 116. The screen sharing between the first data processing system 102 and the second data processing system 104 may happen simultaneously.

In one embodiment, the first data processing system 102 and the second data processing system 104 may include, but not limited to, desktop computer, laptop, smartphone or the like.

Figure 2:
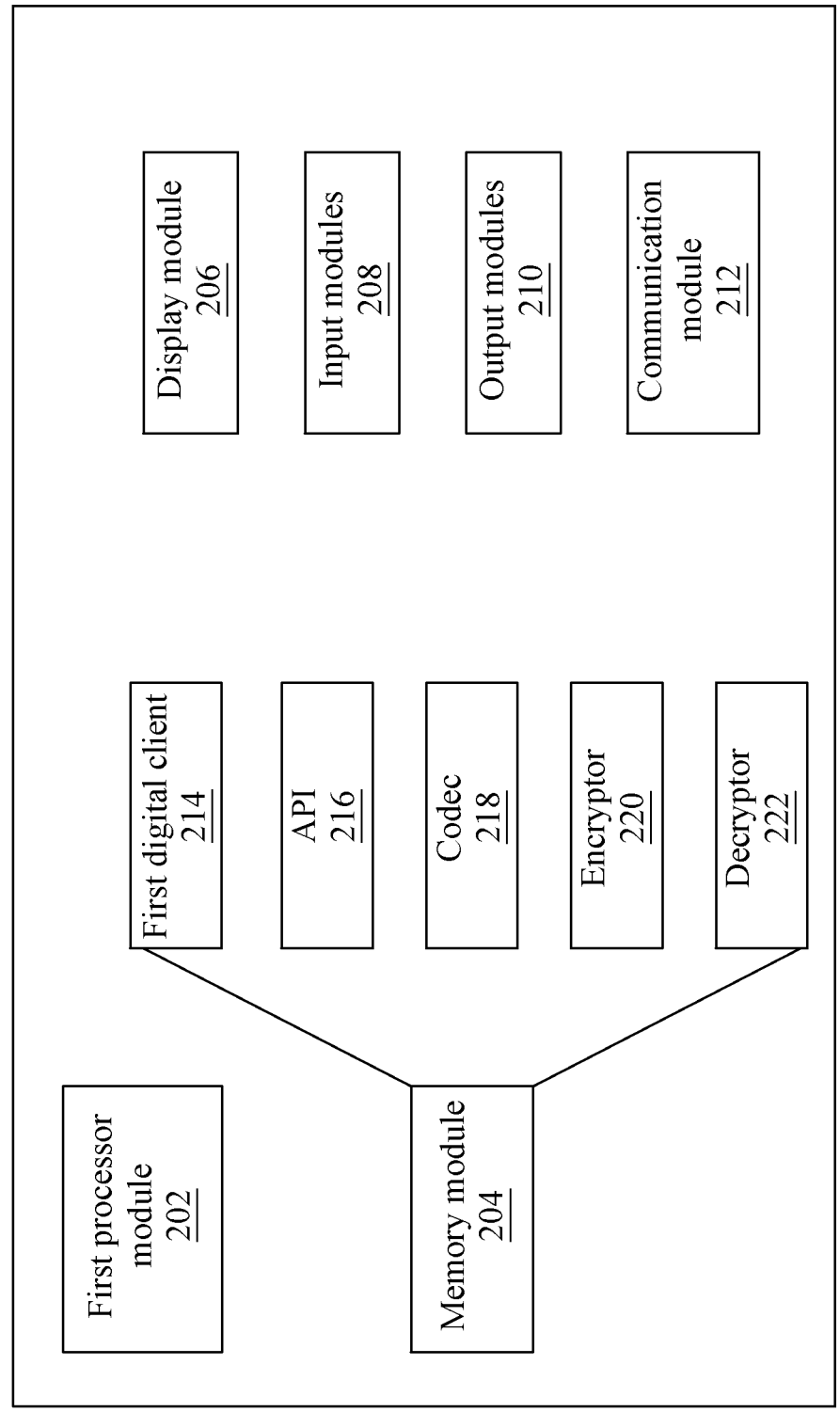
FIG. 2 is a block diagram illustrating a first data processing system 102, in accordance with an embodiment.

FIG. 2 is a block diagram illustrating a first data processing system 102, in accordance with an embodiment. The first data processing system 102 may comprise a first processor module 202, a memory module 204, a display module 206, input modules 208, output modules 210 and a communication module 212.

The first processor module 202 may be implemented in the form of one or more processors and may be implemented as appropriate in hardware, computer-executable instructions, firmware, or combinations thereof. Computer-executable instruction or firmware implementations of the first processor module 202 may include computer-executable or machine-executable instructions written in any suitable programming language to perform the various functions described.

The memory module 204 may include a permanent memory such as hard disk drive, may be configured to store data, and executable program instructions that are implemented by the processor module. The memory module 204 may be implemented in the form of a primary and a secondary memory. The memory module 204 may store additional data and program instructions that are loadable and executable on the first processor module 202, as well as data generated during the execution of these programs. Further, the memory module 204 may be volatile memory, such as random-access memory and/or a disk drive, or non-volatile memory. The memory module 204 may comprise of removable memory such as a Compact Flash card, Memory Stick, Smart Media, Multimedia Card, Secure Digital memory, or any other memory storage that exists currently or may exist in the future.

In an embodiment, the memory module 204 may further comprise a first digital client 214, an Application Programming Interface (API) 216, a codec 218, an encryptor 220 and a decryptor 222. The first digital client 214 may be a web browser or a software application enabling multiple screen sharing simultaneously, wherein the first digital client 214 may further comprise a first digital client display interface. The codec 218 may include computer-executable or machine-executable instructions written in any suitable programming language to perform compress outgoing data and decompress incoming data. The encryptor 220 may encrypt the data being sent and decryptor 222 may decrypt the incoming data.

The display module 206 may displays an image, a video, or data to a user. For example, the display module 206 may include a panel, and the panel may be an LCD, LED or an AM-OLED.

The input modules 208 may provide an interface for input devices such as keypad, touch screen, mouse and stylus among other input devices. In an embodiment, the input modules 208 includes a camera and a microphone.

The output modules 210 may provide an interface for output devices such as display screen, speakers, printer and haptic feedback devices, among other output devices.

The communication module 212 may be used by the first data processing system 102 to communicate with the remote server 106. The communication module 212, as an example, may be a GPRS module, or other modules that enable wireless communication.

Figure 3:
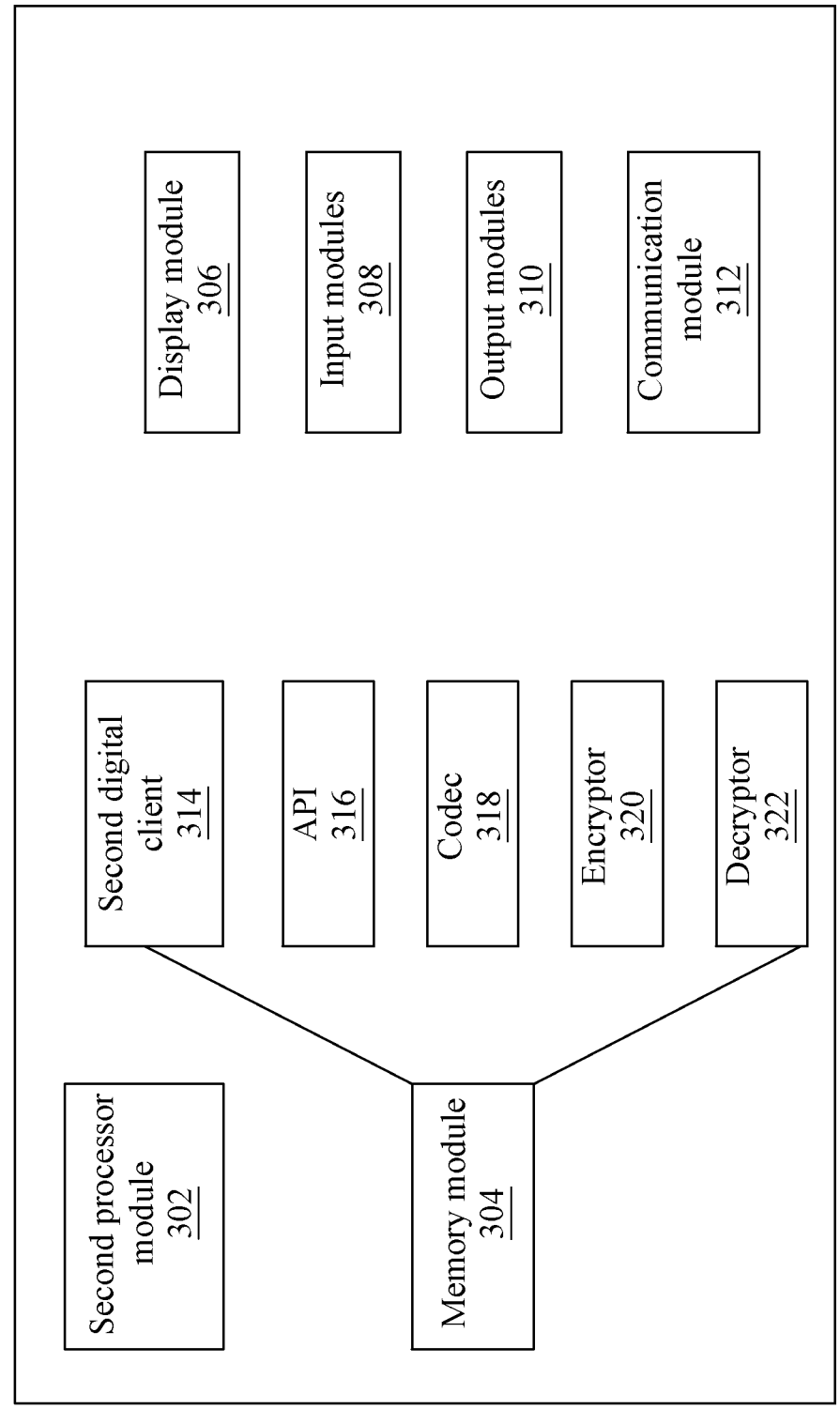
FIG. 3 is a block diagram illustrating a second data processing system 104, in accordance with an embodiment.

The second data processing system 104 may comprise a similar architecture to the first data processing system 102. FIG. 3 is a block diagram illustrating a second data processing system 104, in accordance with an embodiment. The second data processing system 104 may comprise a second processor module 302, a memory module 304 with a second digital client 314, a display module 306, input modules 308, output modules 310 and a communication module 312.

Figure 4:
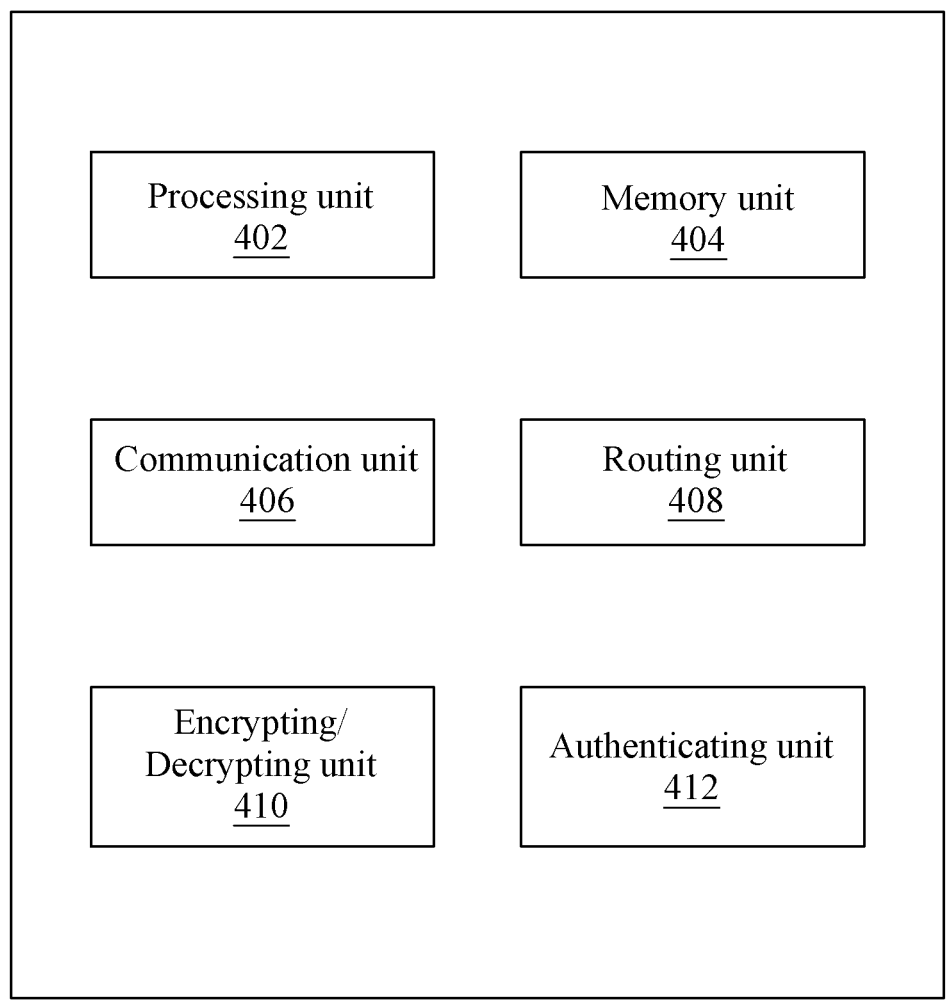
FIG. 4 is a block diagram illustrating a remote server 106, in accordance with an embodiment.

FIG. 4 is a block diagram illustrating a remote server 106, in accordance with an embodiment. The remote server 106 may comprise a processing unit 402, a memory unit 404, a communication unit 406, a routing unit 408, an encrypting/decrypting unit and an authenticating unit 412.

The processing unit 402 may be implemented in the form of one or more processors and may be implemented as appropriate in hardware, computer-executable instructions, firmware, or combinations thereof. Computer-executable instruction or firmware implementations of the processing unit 402 may include computer-executable or machine-executable instructions written in any suitable programming language to perform the various functions described.

The memory unit 404 may include a permanent memory such as hard disk drive, may be configured to store data, and executable program instructions that are implemented by the processor module.

The communication unit 406 may be used by the remote server 106 to communicate with the first data processing system 102 and the second data processing system 104. The communication unit 406, as an example, may be a GPRS module, or other modules that enable wireless communication.

The routing unit 408 may enable identification of data processing systems to which the data must be transmitted.

The encrypting/decrypting unit 410 may encrypt the incoming data from the first data processing system 102 and decrypt the outgoing data from the remote server 106.

The authenticating unit 412 may authenticate the first data processing system 102 and the second data processing system 104 before establishing a connection.

Figure 5:
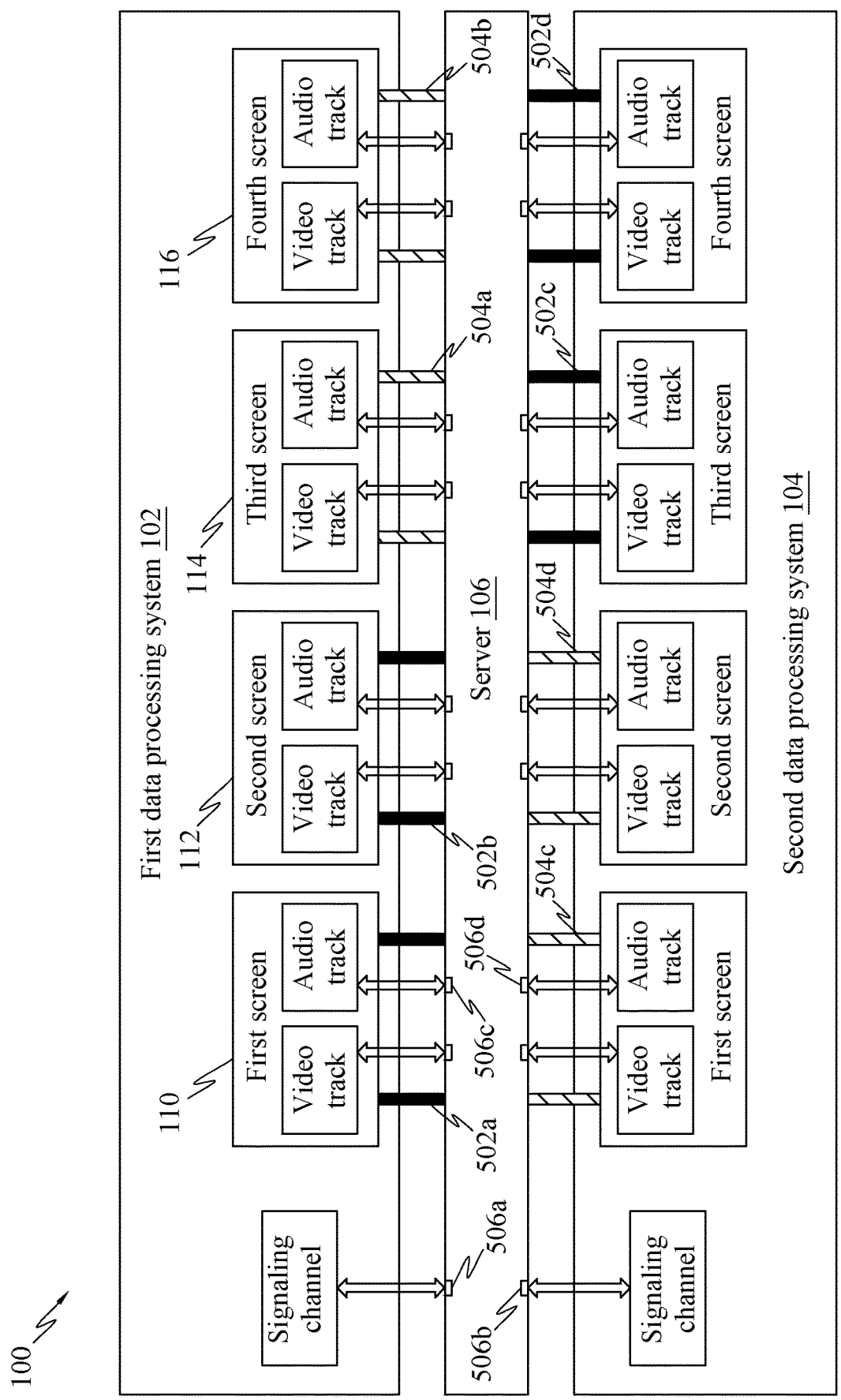
FIG. 5 illustrates an architecture of a system enabling multiple screens sharing in an online meeting, in accordance with an embodiment.

FIG. 5 illustrates an architecture of a system 100 enabling multiple screens sharing in an online meeting, in accordance with an embodiment. The first data processing system 102 may establish a connection with the remote server 106 via a UDP socket 506a using a signalling channel, wherein the first data processing system 102 may be authenticated by the user using the authenticating 412 unit of the remote server 106 before establishing a connection. Similarly, the second data processing system 104 may establish a connection with the first data processing system 102 via the remote server 106 via a UDP socket 506b using the signalling channel. The routing unit 408 of the remote server 106 may obtain the IP addresses of the first data processing system 102 and the second data processing system 104 and establish a connection between the two data processing systems.

After establishing the connection, the first processor module 202 of the first data processing system 102 may individually share the first screen 110 and the second screen 112 via the first digital client 214. Similarly, the second processor module 302 of the second data processing system 104 may individually share the third screen 114 and the fourth screen 116 via the second digital client 314. The first digital client 214 may share the first screen 110 and the second screen 112 while the second digital client 314 shares the third screen 114 and the fourth screen 116.

In one embodiment, the first digital client 214 may create a first publishing data channel (502a and 502b) for each of the screens shared by the first digital client 214, wherein each of the first publishing data channels (502a and 502b) may publish the screens (first screen 110 and second screen 112) shared by the first digital client 214. Similarly, the second digital client 314 may create a second publishing data channel (502c and 502d) for each of the screens shared by the second digital client 314, wherein each of the second publishing data channels (502c and 502d) may publish the screens (third screen 114 and the fourth screen 116) shared by the second digital client 314.

In one embodiment, each of the first publishing data channels (502a and 502b) and the second publishing data channels (502c and 502d) may comprise a video track and an audio track, wherein each of the video track and the audio track of each publishing data channel forms a UDP socket (506c and 506d) with the remote server 106 to share the video stream and audio stream of the screen.

In one embodiment, the first digital client 214 may create a first receiving data channel (504a and 504b) for each of the screens shared by the second digital client 314, wherein each of the first receiving data channels (504a and 504b) may receive the screens (third screen 114 and fourth screen 116) shared by the second digital client 314. Similarly, the second digital client 314 may create a second receiving data channel (504c and 504d) for each of the screens shared by the first digital client 214, wherein each of the second receiving data channels (504c and 504d) may receive the screens (first screen 110 and the second screen 112) shared by the first digital client 214.

Figure 6:
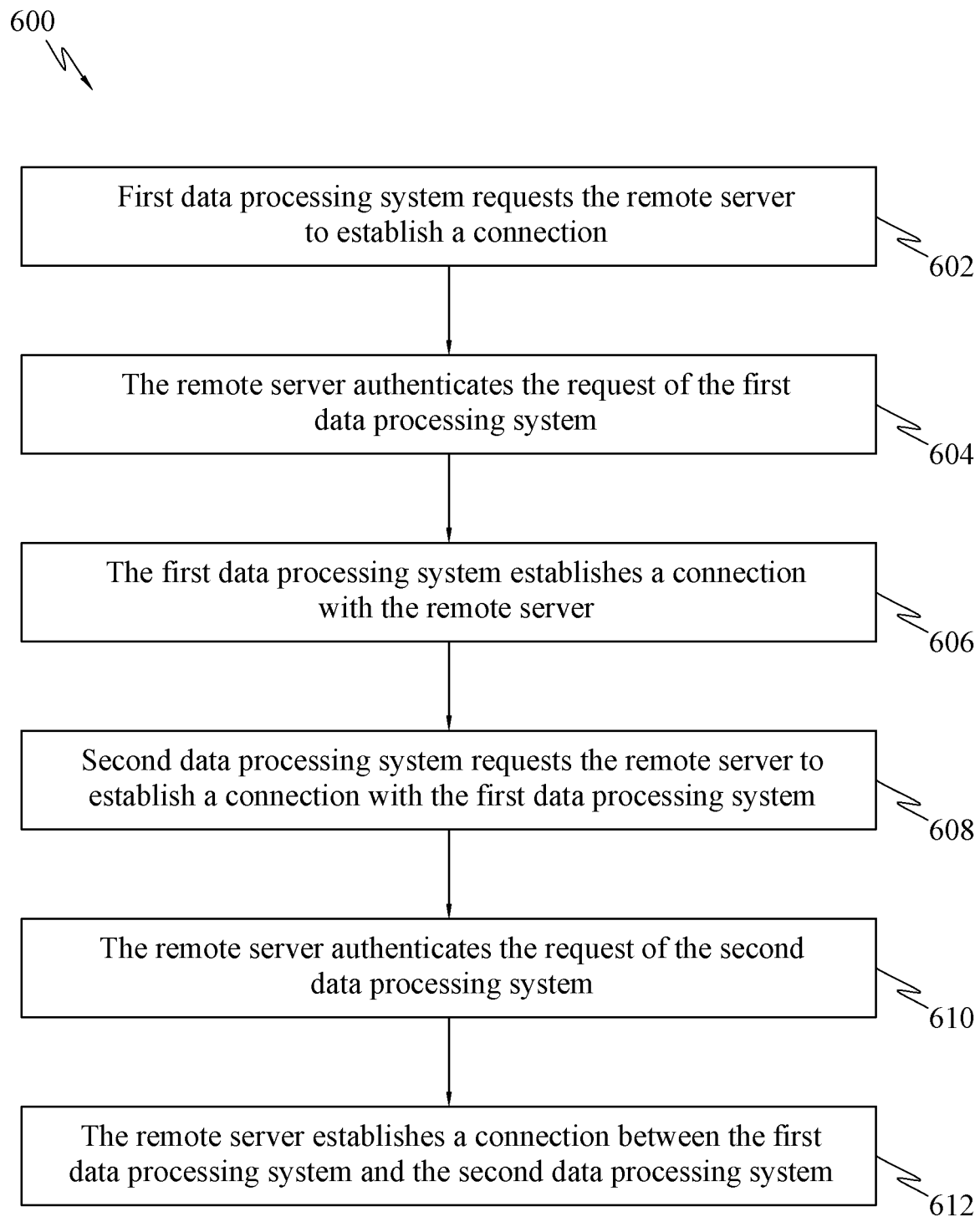
FIG. 6 is a flowchart of process of establishing a connection between the first data processing system 102 and the second data processing system 104.

FIG. 6 is a flowchart of process of establishing a connection between the first data processing system 102 and the second data processing system 104. At step 602, the first data processing system 102 may request the remote server 106 to establish a connection. The first data processing system 102 may send a series of messages or commands requesting the remote server 106 to establish a connection.

At step 604, the remote server 106 may receive the request from the first data processing system 102 and may authenticate the request using the authenticating unit 412.

At step 606, after successful authentication, the remote server 106 may establish a connection with the first data processing system 102 via the signaling channel.

At step 608, the second data processing system 104 may request the remote server 106 to establish a connection with the first data processing system 102. As an example, the second data processing system 104 may provide an online meeting identifier for connecting with the first data processing system 102.

At step 610, the remote server 106 may authenticate the request received from the second data processing system 104 using the authenticating unit 412.

At step 612, after successful authentication, the remote server 106 may establish a connection between the first data processing system 102 and the second data processing system 104 using the signalling channels.

Figure 7:
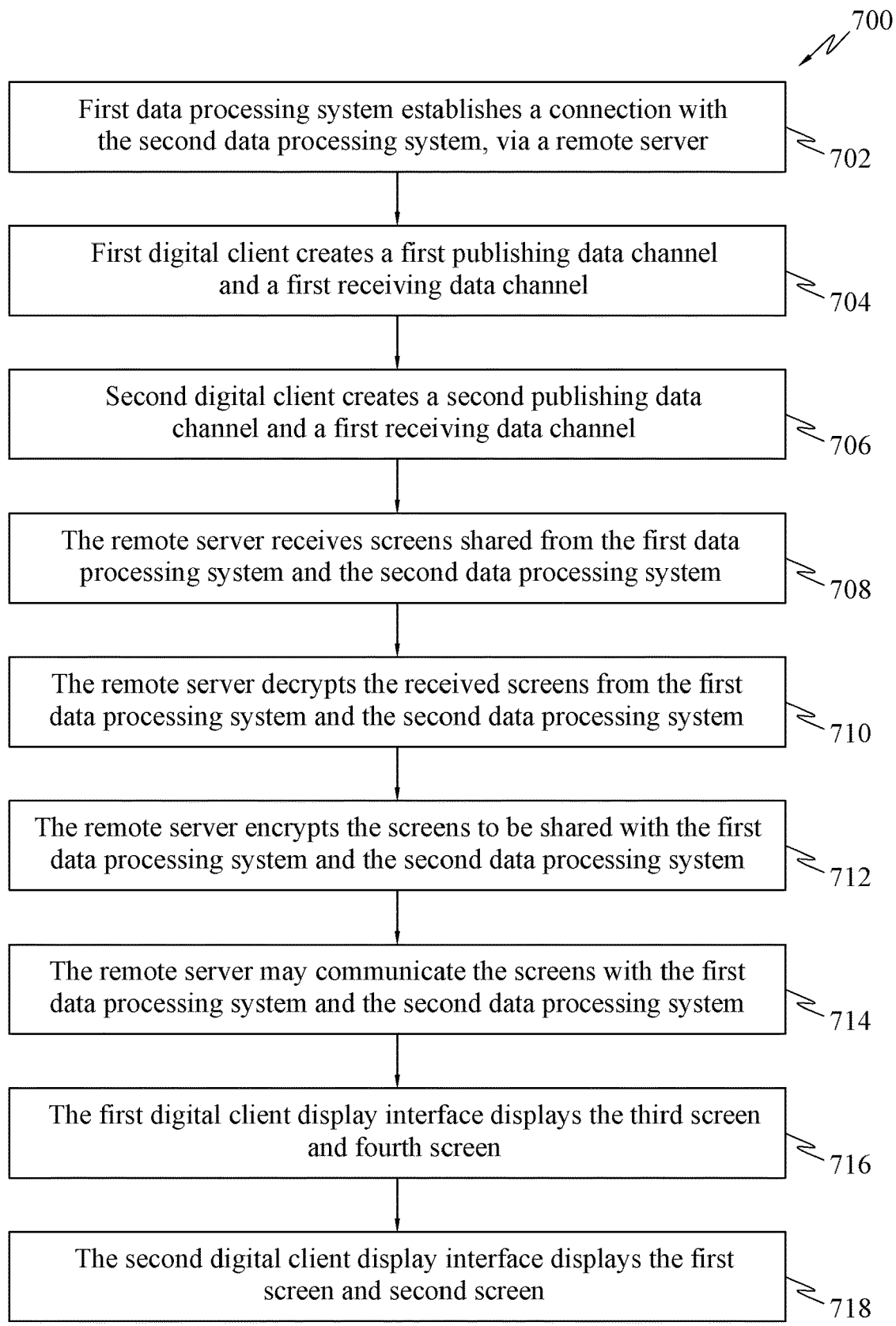
FIG. 7 is flowchart of steps for sharing multiple screens during an online meeting, in accordance with an embodiment.

FIG. 7 is flowchart of steps for sharing multiple screens during an online meeting, in accordance with an embodiment. At step 702, as explained in FIG. 6, the first data processing system 102 and the second data processing system 104 may establish a connection for an online meeting between them.

At step 704, the first digital client 214 may create a first publishing data channel (502a and 502b) for each of the screens shared by the first digital client 214, wherein each of the first publishing data channels (502a and 502b) may publish the screens (first screen 110 and second screen 112) shared by the first digital client 214. Further, the first digital client 214 may create a first receiving data channel (504a and 504b) for each of the screens shared by the second digital client 314, wherein each of the first receiving data channels (504a and 504b) may receive the screens (third screen 114 and fourth screen 116) shared by the second digital client 314.

Similarly, at step 706, the second digital client 314 may create a second publishing data channel (502c and 502d) for each of the screens shared by the second digital client 314, wherein each of the second publishing data channels (502c and 502d) may publish the screens (third screen 114 and the fourth screen 116) shared by the second digital client 314. Further, the second digital client 314 may create a second receiving data channel (504c and 504d) for each of the screens shared by the first digital client 214, wherein each of the second receiving data channels (504d and 504d) may receive the screens (first screen 110 and the second screen 112) shared by the first digital client 214.

In one embodiment, the codec (218 and 318) of the first data processing system 102 and the second data processing system 104 may compress the screens before sharing them with the remote server 106. Further, the encryptor (220 and 320) of the first data processing system 102 and the second data processing system 104 may encrypt the screens before sharing with the remote server 106.

In one embodiment, the first screen 110 may comprise a video stream and an audio stream, obtained from a first camera and a first microphone, respectively, connected to the first data processing system 102 and the third screen 114 may comprise a video stream and an audio stream, obtained from a second camera and a second microphone, respectively, connected to the second data processing system 104.

In one embodiment, the second screen 112 may comprise a video stream and an audio stream, obtained from a first software application present on the first data processing system 102, wherein the video stream and the audio stream obtained from the first software application is independent of the first camera and the first microphone and the fourth screen 116 may comprise a video stream and an audio stream, obtained from a second software application present on the second data processing system 104, wherein the video stream and the audio stream obtained from the second software application is independent of the second camera and the second microphone. As an example, the second screen 112 and the fourth screen 116 may be a window of a media player playing a video, a presentation so on and so forth.

At step 708, the remote server 106 may receive the screens published from the first digital client 214 and the second digital client 314 via the first publishing data channels (502a and 502b) and the second publishing data channels (502c and 502d) respectively.

At step 710, the encrypting/decrypting unit 410 of the remote server 106 may decrypt the received screens from the first digital client 214 and the second digital client 314 via the first publishing data channels (502a and 502b) and the second publishing data channels (502c and 502d) respectively.

At step 712, the encrypting/decrypting unit 410 of the remote server 106 may encrypt the decrypted screens received from the first digital client 214 and the second digital client 314. The encryption protocol may be dependent on the data processing systems with which the screens are shared.

At step 714, the remote server 106 may communicate the encrypted screen shares with the first data processing system 102 and the second data processing system 104 via the first receiving data channels (504a and 504b) and the second receiving data channels (504c and 504d) respectively. The remote server 106 may send the screens to appropriate data processing systems using the routing unit 408, wherein the IP addresses of the data processing systems are used to communicate the screens.

At step 716, the first digital client display interface may display the visual content of the third screen 114 and the fourth screen 116 on the display module 206 of the first data processing system 102. In one embodiment, the visual content of the third screen 114 and the fourth screen 116 may be displayed in individual display windows.

At step 718, the second digital client 314 display interface may display the visual content of the first screen 110 and the second screen 112 on the display module 206 of the second data processing system 104. In one embodiment, the visual content of the first screen 110 and the second screen 112 may be displayed in individual display windows.

In one embodiment, the first processor module 202 may cause the first digital client 214 to publish the visual content of the first screen 110 and the second screen 112 in the individual display windows of the first digital client display interface, by sourcing the visual content corresponding to the first screen 110 and the second screen 112 locally within the first data processing system 102, without requiring the remote server 106 to send the visual content of the first screen 110 and the second screen 112 to the first data processing system 102. Similarly, the second processor module 302 may cause the second digital client 314 to publish the visual content of the third screen 114 and the fourth screen 116 in the individual display windows of the second digital client 314 display interface, by sourcing the visual content corresponding to the third screen 114a nd the fourth screen 116 locally within the second data processing system 104, without requiring the remote server 106 to send the visual content of the third screen 114 and the fourth screen 116 to the second data processing system 104.

In one embodiment, the first digital client display interface may display the visual content of the first screen 110 and the second screen 112 (locally sourced) and the third screen 114 and the fourth screen 116 received via the first receiving data channels (504a and 504b). Similarly, the second digital client 314 display interface may display the visual content of the third screen 114 and the fourth screen 116 (locally sourced) and the first screen 110 and the second screen 112 received via the second receiving data channels (504c and 504d).

Figure 8:
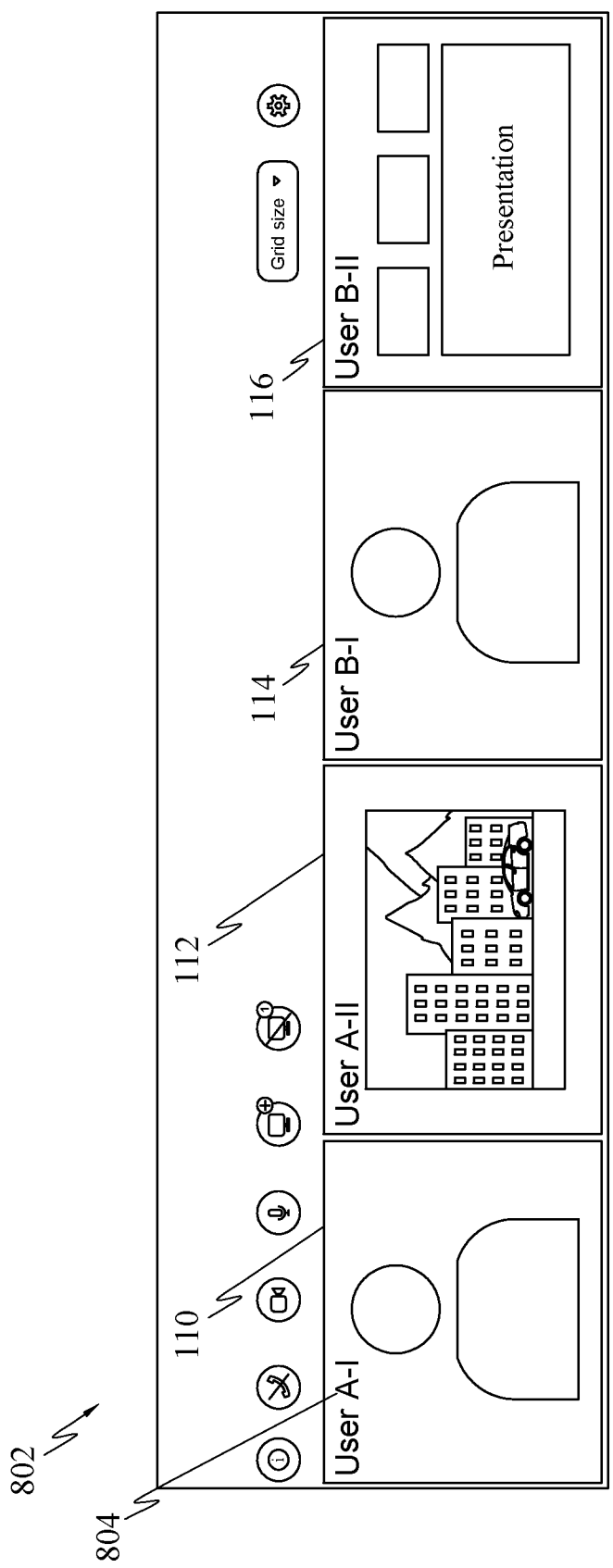
FIG. 8 illustrates a first digital client display interface 802, in accordance with an embodiment.

FIG. 8 illustrates a first digital client display interface 802, in accordance with an embodiment. The first digital client display interface 802 may display the visual content of the first screen 110, the second screen 112, the third screen 114 and the fourth screen 116 in individual windows simultaneously. Each of the windows may be provided with an identity 804 and the identity may be displayed in the first digital client 214 and the second digital client 314, wherein the identity may represent the digital client from which the screen is published. Similarly, second digital client display interface may display the visual content of the first screen 110, the second screen 112, the third screen 114 and the fourth screen 116 in individual windows simultaneously as shown in FIG. 8.

In one embodiment, the remote server 106 may record an identity 804 for each of the screens shared by the first digital client 214 and the second digital client 314 and further communicate the identity 804 with the first digital client 214 and the second digital client 314.

In another embodiment, the remote server 106 may create an identity 804 for each of the screens shared by the first digital client 214 and the second digital client 314.

In one embodiment, the identity 804 for each of the screens shared by the first digital client 214 and the second digital client 314 may comprise an image. As an example, the image may be profile picture of the user of the digital client.

In one embodiment, each of the identities 804 may be unique compared to each other thereby enabling easier identification of the screens.

In one embodiment, each of the identities 804 created for the screens shared may comprise a first portion and a second portion. The first portion may identify user of the first digital client 214 or the second digital client 314, whichever shared the screen and the second portion may be unique compared to identities for screens shared by the same digital client.

Figure 9:
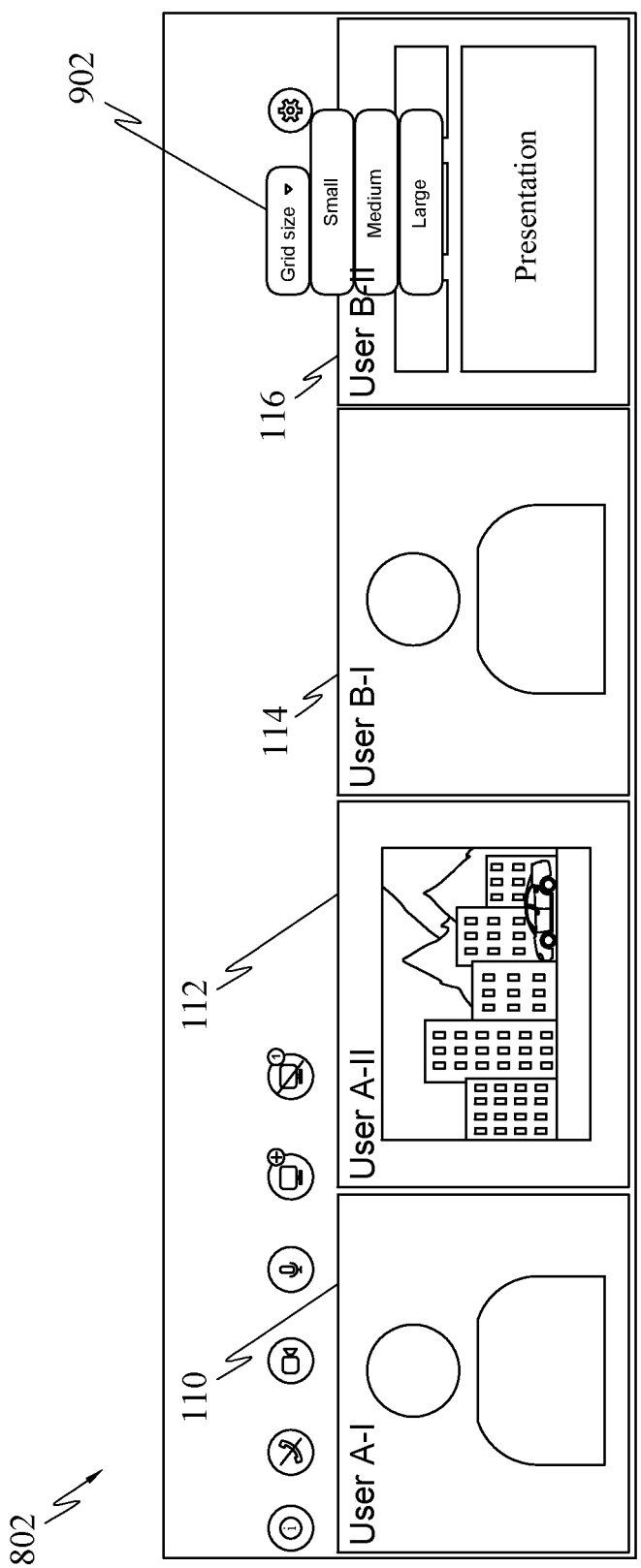
FIG. 9 is an illustration of the first digital client display interface 802, in accordance with an embodiment.

FIG. 9 is an illustration of the first digital client display interface 802, in accordance with an embodiment. The first digital client 214 may cause display in the first digital client display interface 802, visual content of the first screen 110, the second screen 112, the third screen 114 and the fourth screen 116 in individual display windows, wherein the individual display windows of the first digital client display interface 802 may be arranged in a grid of equally sized windows.

In one embodiment, the first processor module 202 may change the size of the individual display windows, of the first digital client display interface, simultaneously to equally sized larger or smaller sized windows based on an input received from a first user. As an example, the user may choose the window size such as small, medium or large from a grid size icon 902 to simultaneously adjust the size of all the windows.

In one embodiment, the first processor module 202 may cause the first digital client 214 to move one of the individual display windows to a desired location within the first digital client display interface, based on an input received from a first user of the first data processing system 102.

Figure 10:
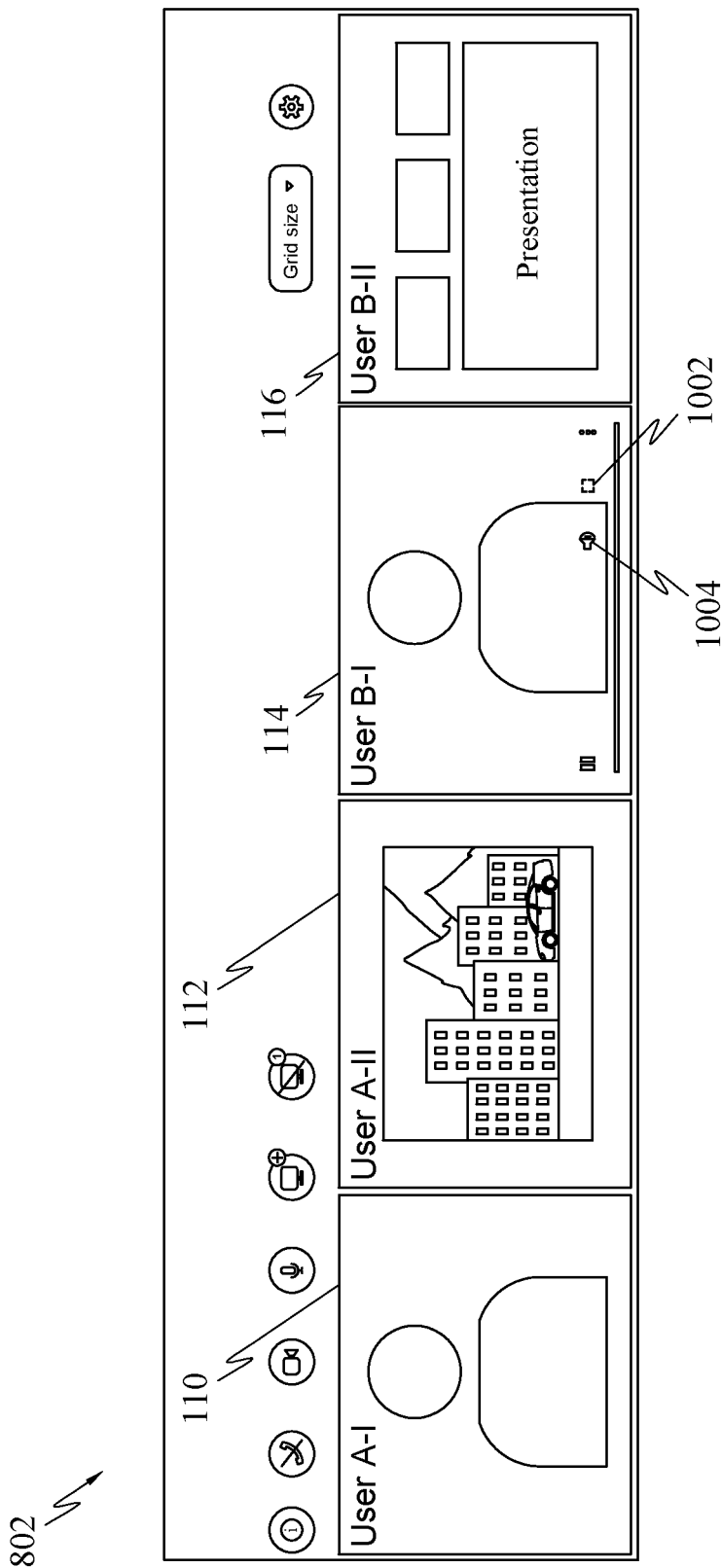
FIG. 10 illustrates the first digital client display interface 802, in accordance with an embodiment.

FIG. 10 illustrates the first digital client display interface 802, in accordance with an embodiment. The first processor module 202 may cause the first digital client 214 to change the size of one of the individual display windows of the first digital client display interface, based on an input received from a first user. As an example, the enlarge icon 1002 of a particular window may be activated to increase the size of that window.

In one embodiment, the first processor module 202 may cause the first digital client 214 to enable playing of the audio streams corresponding to the third screen 114 and the fourth screen 116. Similarly, the second processor module 302 may cause the second digital client 314 to enable playing of the audio streams corresponding to the first screen 110 and the second screen 112.

In another embodiment, based on input from a first user of the first data processing system 102, the first processor module 202 may cause the first digital client 214 to selectively stop playing one or both of the audio streams corresponding to the third screen 114 and the fourth screen 116. As an example, the mute icon 1004 may be activated by the first user to stop playing the audio stream from the third screen 114.

Figure 11:
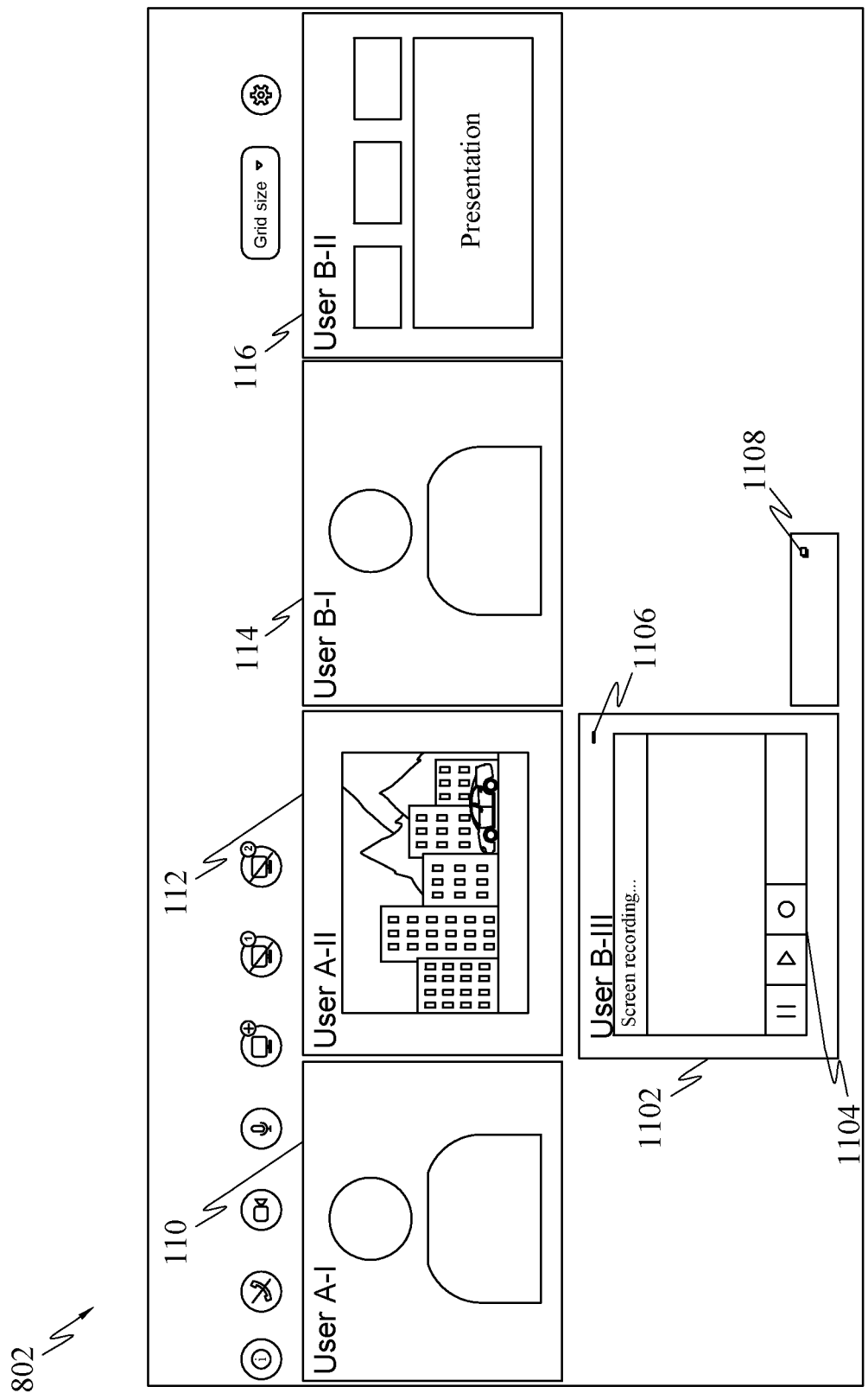
FIG. 11 illustrates the first digital client display interface 802, in accordance with an embodiment.

FIG. 11 illustrates the first digital client display interface, in accordance with an embodiment. The first processor module 202, based on input from the first user of the first data processing system 102, may enable the recording of audio-visual content of at least one of the screens displayed on the first digital client display interface. As an example, the record icon may be activated by the first user to record a screen shared by the second digital client 314.

In one embodiment, the first processor module 202 may be configured to record audio-visual content of all of the screens displayed on the first digital client 214.

In one embodiment, first processor module 202, based on an input received from a first user, may cause the first digital client 214 to minimize at least one of the individual display windows of the first digital client display interface, while displaying the visual content in remaining of the of the individual display windows of the first digital client display interface, which are not minimized. As an example, the minimize icon 1106 may be activated to minimize the window and the restore icon 1108 may be activated to restore the window to its original size.

Figure 12A:
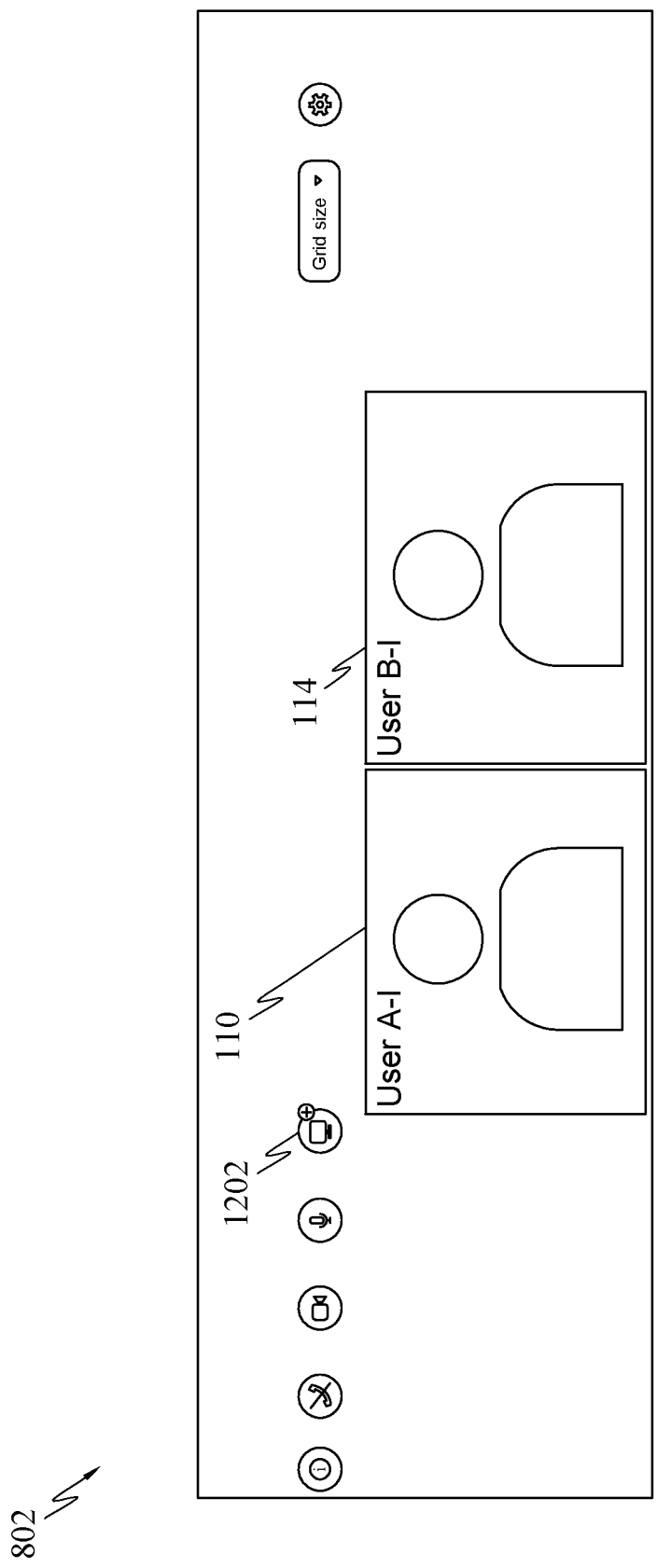
FIG. 12A illustrates the first digital client display interface 802, in accordance with an embodiment.

FIGS. 12A-12D illustrates the process of sharing multiple screens in an online meeting, in accordance with an embodiment. Referring to FIG. 12A, the first digital client display interface 802 may display the first screen 110 and the third screen 114. The first screen 110 may comprise a video stream and an audio stream, obtained from a first camera and a first microphone, respectively, connected to the first data processing system 102 and the third screen 114 may comprise a video stream and an audio stream, obtained from a second camera and a second microphone, respectively, connected to the second data processing system 104. The first digital client display interface 802 may display a screen share icon 1202. The first user of the first data processing system 102 may activate the screen share icon 1202 to share a screen with the second data processing system 104.

Figure 12B:
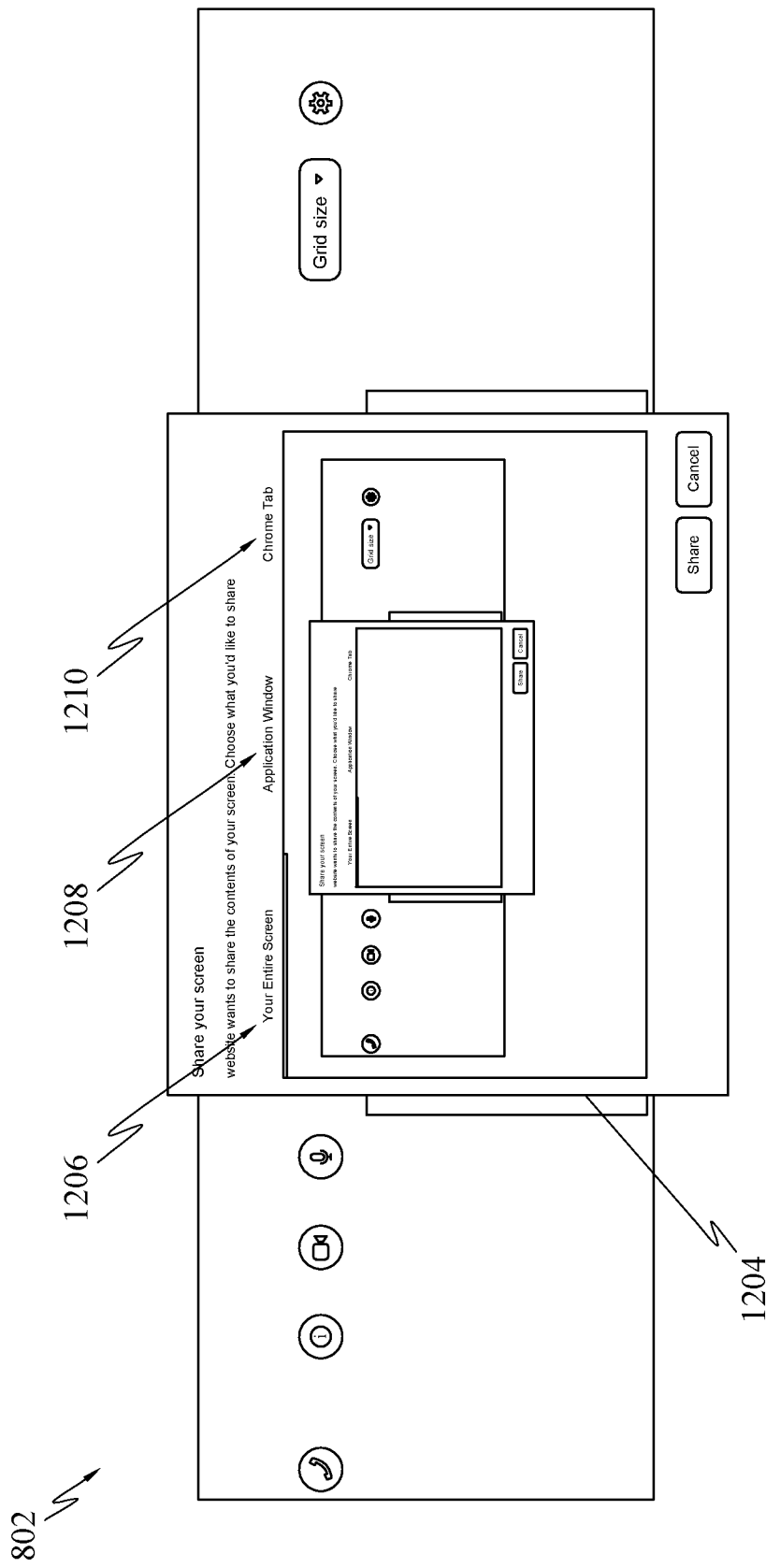
FIG. 12B illustrates the first digital client display interface 802, in accordance with an embodiment.

Referring to FIG. 12B, upon activating the screen share icon 1202, the first digital client display interface 802 may open a selection window 1204. The selection window 1204 may comprise a first icon 1206, a second icon 1208 and a third icon 1210. The first icon 1206 may enable the first user of the first data processing system 102 to share the entire screen of the first data processing system 102.

Figure 12C:
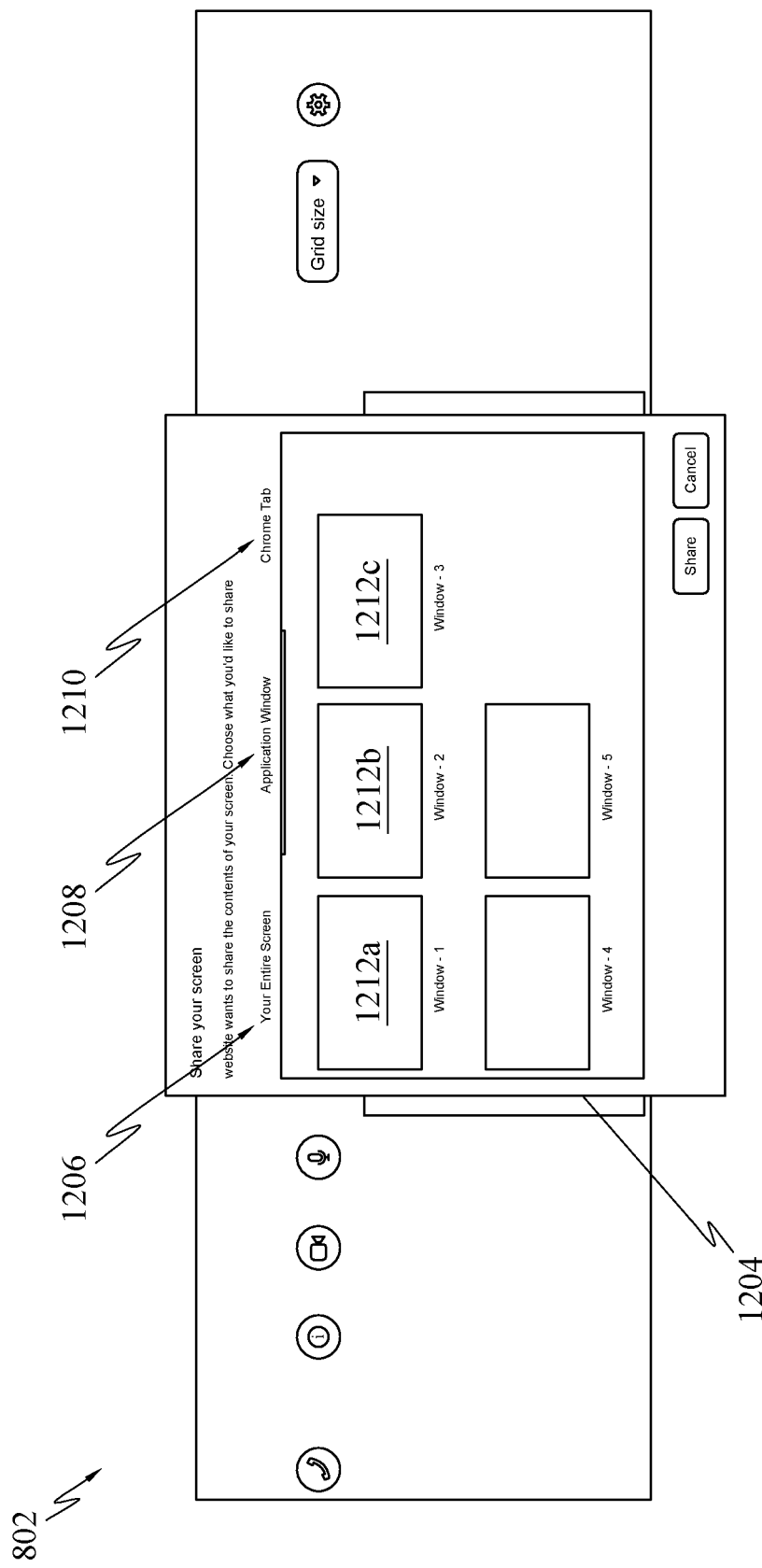
FIG. 12C illustrates the first digital client display interface 802, in accordance with an embodiment.

Referring to FIG. 12C, the first user may activate the second icon 1208 to share a particular window from a multiple application windows. As an example, the first user may have multiple application windows (1212a, 1212b and 1212c) open in the first data processing system 102 and may want to share only the window of a particular application. The first user may select the particular window that is to be shared from the multiple application windows (1212a, 1212b and 1212c).

Figure 12D:
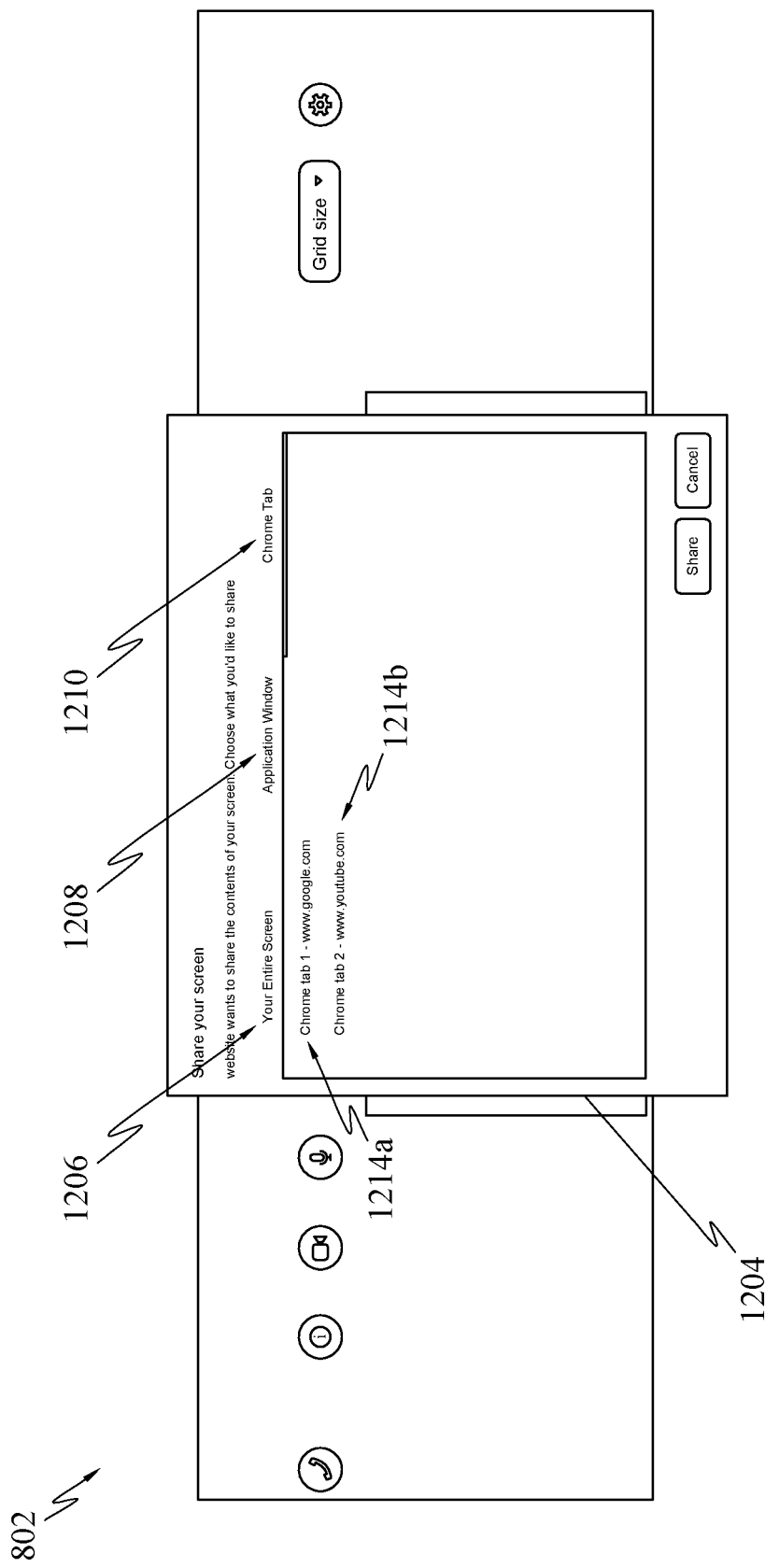
FIG. 12D illustrates the first digital client display interface 802, in accordance with an embodiment.

Referring to FIG. 12D, the first user may activate the third icon 1210 to share a particular tab from an application such as a web browser. The first user may select the tab to be shared from the plurality of tabs (1214a and 1214b) that are open. The first user of the first data processing system 102 may repeat the process to share another screen with the second data processing system 104 thereby sharing multiple screens with the second data processing system 104 simultaneously. Similarly, a second user of the second data processing system 104 may share multiple screens with the first data processing system.

Therefore, it is clear that the system for enabling multiple screen sharing in an online meeting disclosed herein is completely different from the existing video conferencing tools. As an example, TEAMVIEWER enables a user to control or share desktop screens remotely. However, in TEAMVIEWER one computing system provides control or shares the screen of the entire computing system. It does not enable individually and selectively sharing screens with another computing system. As explained in FIGS. 12A-12D, the system for enabling multiple screen sharing in an online meeting, enables a user to individual share a screen of the first data processing system 102.

The processes described above is described as a sequence of steps, this was done solely for the sake of illustration. Accordingly, it is contemplated that some steps may be added, some steps may be omitted, the order of the steps may be re-arranged, or some steps may be performed simultaneously.

The example embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the system and method described herein. Accordingly, the specification and drawings are to be regarded in an illustrative rather than a restrictive sense.

Many alterations and modifications of the present invention will no doubt become apparent to a person of ordinary skill in the art after having read the foregoing description. It is to be understood that the phraseology or terminology employed herein is for the purpose of description and not of limitation. It is to be understood that the description above contains many specifications, these should not be construed as limiting the scope of the invention but as merely providing illustrations of some of the personally preferred embodiments of this invention.

What is claimed is:

1. A system enabling multiple screens sharing in an online meeting, the system comprising:
    a first data processing system comprising a first processor and a first digital client, the first processor causing the first digital client to individually share at least a first screen and a second screen; and
    a second data processing system comprising a second processor and a second digital client, the second processor causing the second digital client to individually share at least a third screen and a fourth screen;
    wherein,
        the first digital client shares the first screen and the second screen while the second digital client shares the third screen and the fourth screen;
        the first digital client comprises a first digital client display interface, wherein the first digital client displays in the first digital client display interface, visual content of the third screen and the fourth screen in individual display windows; and
        the second digital client comprises a second digital client display interface, wherein the second digital client displays in the second digital client display interface, visual content of the first screen and visual content of the second screen in individual display windows, while the first digital client displays the visual content of the third screen and the fourth screen;

the first processor causes the first digital client to create a first publishing data channel for each of the screens shared by the first digital client, wherein each of the first publishing data channels comprises an video track and an audio track, wherein each of the first publishing channels publishes the respective screens shared by the first digital client to a remote destination;

the first processor causes the first digital client to create a first receiving data channel for each of the screens shared by the second digital client, wherein each of the first receiving data channels comprises an video track and an audio track, wherein each of the first receiving channels receives the respective screens shared by the second digital client;

the second processor causes the second digital client to create a second publishing data channel for each of the screens shared by the second digital client, wherein each of the second publishing data channels comprises an video track and an audio track, wherein each of the second publishing channels publishes the respective screens shared by the second digital client to a remote destination; and the second processor causes the second digital client to create a second receiving data channel for each of the screens shared by the first digital client, wherein each of the second receiving data channels comprises an video track and an audio track, wherein each of the second receiving channels receives the respective screens shared by the first digital client.

2. The system of claim 1, wherein,
the first processor causes the first digital client to display in the first digital client display interface, visual content of the screens shared by the first digital client and the second digital client in individual display windows; and
the second processor causes the second digital client to display in the second digital client display interface, visual content of the screens shared by the first digital client and the second digital client in individual display windows.

3. The system of claim 2, wherein,
the first screen comprises a video stream and an audio stream, obtained from a first camera and a first microphone, respectively, connected to the first data processing system; and
the third screen comprises a video stream and an audio stream, obtained from a second camera and a second microphone, respectively, connected to the second data processing system.

4. The system of claim 3, wherein,
the second screen comprises a video stream and an audio stream, obtained from a first software application present on the first data processing system, wherein the video stream and the audio stream obtained from the first software application is independent of the first camera and the first microphone; and
the fourth screen comprises a video stream and an audio stream, obtained from a second software application present on the second data processing system, wherein the video stream and the audio stream obtained from the second software application is independent of the second camera and the second microphone.

5. The system of claim 2, wherein the first processor modulo causes the first digital client to display in the first digital client display interface, visual content of the first screen, the second screen, the third screen and the fourth screen in individual display windows, wherein the individual display windows of the first digital client display interface are arranged in a grid of equally sized windows.

6. The system of claim 5, wherein the first processor causes the first digital client to, based on an input received from a first user, change the size of the individual display windows, of the first digital client display interface, simultaneously to equally sized larger or smaller sized windows.

7. The system of claim 2, wherein the first processor causes the first digital client to, based on an input received from a first user, change the size of one of the individual display windows of the first digital client display interface.

8. The system of claim 2, wherein the first processor causes the first digital client to, based on an input received from a first user, move one of the individual display windows to a desired location within the first digital client display interface.

9. The system of claim 2, wherein the first processor causes the first digital client to, based on an input received from a first user, minimize at least one of the individual display windows of the first digital client display interface, while displaying the visual content in remaining of the of the individual display windows of the first digital client display interface, which are not minimized.

10. The system of claim 2, wherein,
the third screen comprises a video stream and an audio stream, obtained from a second camera and a second microphone, respectively, connected to the second data processing system;
the fourth screen comprises a video stream and an audio stream, obtained from a second software application present on the second data processing system, wherein the video stream and the audio stream obtained from the second software application is independent of the second camera and the second microphone;
the first processor causes the first digital client to enable playing of the audio streams corresponding to the third screen and the fourth screen; and
the first processor, based on input from a first user of the first data processing system, causes the first digital client to selectively stop playing one or both of the audio streams corresponding to the third screen and the fourth screen.

11. The system of claim 1, further comprising a remote server, wherein,
the first data processing system is connected to the remote server;
the second data processing system is connected to the remote server;
the server coordinates sharing of the screens between the first data processing system and second data processing system;
the first processor causes the first digital client to publish the visual content of the first and the second screens in the individual display windows of the first digital client display interface, by sourcing the visual content corresponding to the first and the second screens locally within the first data processing system, without requiring the server to send the visual content of the first and the second screens to the first data processing system; and
the second processor causes the second digital client to publish the visual content of the third and the fourth screens in the individual display windows of the second digital client display interface, by sourcing the visual content corresponding to the third and the fourth screens locally within the second data processing system, without requiring the server to send the visual content of the third and the fourth screens to the second data processing system.

12. The system of claim 11, wherein,
the first publishing channels and the first receiving channels are established between the first data processing system and the remote server;
the second publishing channels and the second receiving channels are established between the second data processing system and the remote server;
the first processor causes the first digital client to publish the screens shared by the first digital client to the remote server via respective first publishing channels;
the second processor causes the second digital client to publish the screens shared by the second digital client to the remote server via respective second publishing channels;
the first processor causes the first digital client to receive the screens shared by the second digital client from the remote server via respective first receiving channels; and
the second processor causes the second digital client to receive the screens shared by the first digital client from the remote server via respective second receiving channels.

13. The system of claim 12, wherein,
the remote server is configured to record an identity for each of the screens shared by the first digital client and the second digital client;
the remote server is configured to communicate the identity for each of the screens shared by the first digital client and the second digital client to the first digital client and the second digital client;
the first processor causes the first digital client to display the identity of the screens correlated with the respective display windows of the first digital client display interface; and
the second processor causes the second digital client to display the identity of the screens correlated with the respective display windows of the second digital client display interface.

14. The system of claim 12, wherein the identity for each of the screens shared by the first digital client and the second digital client comprises an image.

15. The system of claim 12, wherein each of the identities are unique compared to each other.

16. The system of claim 12, wherein the remote server is configured to create the identity for each of the screens shared by the first digital client and the second digital client.

17. The system of claim 16, wherein,
each of the identities created for the screens shared comprises a first portion and a second portion;
the first portion identifies user of the first digital client or the second digital client, whichever shared the screen; and
the second portion is unique compared to identities for screens shared by the same digital client.

18. The system of claim 1, wherein the first processor, based on input from the first user of the first data processing system, enables the recording of audio-visual content of at least one of the screens displayed on the first digital client display interface.

* * * * *